United States Patent Office 2,705,577
Patented Apr. 5, 1955

2,705,577

TILTABLE BOTTLE HOPPER FOR AUTOMATIC VENDING MACHINES

Ralph H. Menning, Kansas City, and James R. Pratt, Independence, Mo., and Robert T. Manley, Kansas City, Kans., assignors to The Vendo Company, Kansas City, Mo., a corporation of Missouri Application July 16, 1951, Serial No. 236,919

1 Claim. (Cl. 221—264)

This invention relates to vending machines wherein dispensable articles are transferred from one compartment to another during the cycle of operation of the machine, the primary object being to provide a tiltable hopper adapted to receive the article when in one of its tilted positions and to discharge the article therefrom when swung to the opposite end of its path of travel.

It is contemplated that the tiltable bottle hopper forming the subject matter hereof shall be used with automatic vending machines such as forms the subject matter of U. S. Letters Patent No. 2,333,118, of November 2, 1943, and No. 2,438,050, of March 16, 1948, wherein bottles are fed singly to a vertically reciprocable cradle for decapping and pouring of the contents thereof.

It is the most important object of the present invention to provide a tiltable bottle hopper adapted for disposition within an opening provided in a partition setting off a pair of cabinet compartments for automatically receiving a bottle from a suitable conveyor system in one compartment and transferring the same to a cradle in another compartment on the opposite side of the aforesaid partition.

Another object hereof is to provide a tiltable bottle-receiving device that is adapted for actuation by the aforesaid cradle as the latter moves to one end of its path of travel, all to the end that the bottle contained by the device is rolled into the cradle automatically.

Other objects include details of construction of the hopper itself, together with the actuating means therefor, all of which will be made clear as the following specification progresses.

In the drawing:

Figure 1 is an elevational view of a tiltable bottle hopper for automatic vending machines made pursuant to the present invention and illustrating the same in a position for transferring a bottle to a cradle or the like.

Fig. 2 is an end elevational view of the hopper showing its disposition relative to each of two compartments.

Fig. 3 is a perspective view of the hopper per se entirely removed from its supporting partition; and Fig. 4 is an end elevational view of the hopper.

The vending machine with which the improved hopper means hereof is particularly adapted to be used, is similar so far as broad operation is concerned, to those of the aforesaid patents and has been disclosed substantially in its entirety by our co-pending application filed on even date herewith and entitled "Machine for Vending the Contents of Bottled Goods."

Such machine includes a hollow cabinet within which is disposed an elongated, vertical partition 10, setting off a pair of side-by-side compartments, one of which is adapted to store articles of merchandise to be vended and particularly horizontally disposed bottles 12.

Bottles 12 rest upon a plurality of superimposed, horizontal shelves 14 along which the same are advanced step-by-step upon operation of a continuous conveyor chain 16. Chain 16 is provided with a plurality of U-shaped brackets 18 that receive the bottles 12 and guide the same along the shelves 14. Continuous chain 16 is arranged in a serpentine path and the bottles 12 are guided at alternate ends of the shelves 14 by arcuate strips 20. Each time the machine is placed in operation through insertion of a suitable coin or coins, the chain 16 is advanced one step to move all of the bottles 12 on their shelves 14 and to discharge a single bottle from the right-hand end of the lowermost shelf 14 (viewing Fig. 2).

In accordance with the present invention, the bottle 12 discharged from the lower shelf 14, is transferred to a cradle 22 by means of a tiltable hopper, broadly designated by the numeral 24 and carried by the partition 10. Cradle 22 is tiltably carried by a reciprocable frame 26 and as the bottle 12 within the cradle 22 is moved upwardly by frame 26, and as the cradle 22 tilts through various angles, cap 28 of the bottle 12 is removed, the contents of the bottle 12 poured, and the empty bottle subsequently discharged into an empty bottle compartment not herein illustrated.

Reciprocating means including a bar 30 pivotally secured to one end of frame 26, and a chain 32 passing over an idler sprocket 34 and secured to the lowermost end of frame 26 serve to impart reciprocable movement to the frame 26 and accordingly to the cradle 22 as well as the bottle contained thereby.

Hopper 24 is L-shaped, presenting a pair of legs 36 and 38 disposed substantially at right angles to each other and joined at one end by a triangular-shaped plate 40. Legs 36 and 38 may either comprise elongated flat panels or be frame-like for purposes of lightness, as illustrated in the drawing. An elongated, tubular barrel 42 extending along the legs 36 and 38 is disposed at the point of merger between such legs and is rigid thereto.

Barrel 42 is adapted to receive a hinge pin 44 that is in turn carried by a U-shaped bracket 46. Each leg respectively of the bracket 46 is in turn provided with a short barrel 48 for receiving the hinge pin 44. An elongated plate, rigidly secured within the cradle 24, is provided with an inclined portion 50 that overlies the barrel 42 and an integral portion 52 that rests directly upon the innermost face of the leg 38 remote from barrel 42.

The partition 10 is provided with an elongated notch or opening 54 within which the hopper 24 is disposed, the bight of bracket 46 being secured directly to partition 10 through the medium of fastening elements 56 with the hinge pin 44 inclined downwardly toward the rearmost wall of the vending machine cabinet not herein illustrated. Such inclination of the hinge pin 44 is substantially the same as the inclination of the cradle 22 when the latter is in the position for receiving a bottle 12 from hopper 24.

An L-shaped link 58 pivotally secured to the partition 10 as at 60, is provided with an ear 62 that extends through an arcuate slot 64 formed in the partition 10 below opening 54, the ear 62 being within the path of travel of the frame 26 as the same moves downwardly to the position shown in Fig. 2 of the drawing.

A spring 66 having one end thereof secured to the partition 10 and the opposite end secured to link 58, holds the latter biased to one end of its path of travel with the ear 62 at the uppermost end of arcuate slot 64 and with hopper 24 at that end of its path of travel opposite to that shown in full lines by Figs. 1 and 2. A short rod 68 is pivotally joined with the link 58 on one side of pivot point 60 opposite to ear 62, the opposite end of the rod 68 being pivotally joined with a finger 70 secured to and extending outwardly from the leg 36 of hopper 24.

When the machine is in a stand-by condition, the frame 26 is disposed slightly higher than that illustrated in Fig. 2 of the drawing, out of contact with the ear 62 and accordingly, the hopper 24 is in the position shown by dotted lines in Fig. 2 of the drawing as influenced by the action of spring 66. When in such stand-by condition, a bottle 12 has been delivered to the hopper 24 and rests therewithin in engagement with leg 36 and with plate 50—52, with the bottom of the bottle 12 bearing against the end plate 40.

During the initial operation of the machine, frame 26 moves downwardly into engagement with the ear 62 causing link 58 to swing on pivot 60 against the action of spring 66. Rod 68 is forced upwardly and the hopper 24 is tilted on pin 44 to the full-line position of Figs. 1 and 2. The bottle 12 contained in the hopper 24 is transferred from one side of partition 10 through opening 54, to the opposite side of the partition 10 and into the cradle 22. Frame 26, cradle 22 and the bottle 12 within cradle 22 thereupon move upwardly, clearing

United States Patent Office

2,705,577
Patented Apr. 5, 1955

2,705,577

TILTABLE BOTTLE HOPPER FOR AUTOMATIC VENDING MACHINES

Ralph H. Menning, Kansas City, and James R. Pratt, Independence, Mo., and Robert T. Manley, Kansas City, Kans., assignors to The Vendo Company, Kansas City, Mo., a corporation of Missouri Application July 16, 1951, Serial No. 236,919

1 Claim. (Cl. 221—264)

This invention relates to vending machines wherein dispensable articles are transferred from one compartment to another during the cycle of operation of the machine, the primary object being to provide a tiltable hopper adapted to receive the article when in one of its tilted positions and to discharge the article therefrom when swung to the opposite end of its path of travel.

It is contemplated that the tiltable bottle hopper forming the subject matter hereof shall be used with automatic vending machines such as forms the subject matter of U. S. Letters Patent No. 2,333,118, of November 2, 1943, and No. 2,438,050, of March 16, 1948, wherein bottles are fed singly to a vertically reciprocable cradle for decapping and pouring of the contents thereof.

It is the most important object of the present invention to provide a tiltable bottle hopper adapted for disposition within an opening provided in a partition setting off a pair of cabinet compartments for automatically receiving a bottle from a suitable conveyor system in one compartment and transferring the same to a cradle in another compartment on the opposite side of the aforesaid partition.

Another object hereof is to provide a tiltable bottle-receiving device that is adapted for actuation by the aforesaid cradle as the latter moves to one end of its path of travel, all to the end that the bottle contained by the device is rolled into the cradle automatically.

Other objects include details of construction of the hopper itself, together with the actuating means therefor, all of which will be made clear as the following specification progresses.

In the drawing:

Figure 1 is an elevational view of a tiltable bottle hopper for automatic vending machines made pursuant to the present invention and illustrating the same in a position for transferring a bottle to a cradle or the like.

Fig. 2 is an end elevational view of the hopper showing its disposition relative to each of two compartments.

Fig. 3 is a perspective view of the hopper per se entirely removed from its supporting partition; and Fig. 4 is an end elevational view of the hopper.

The vending machine with which the improved hopper means hereof is particularly adapted to be used, is similar so far as broad operation is concerned, to those of the aforesaid patents and has been disclosed substantially in its entirety by our co-pending application filed on even date herewith and entitled "Machine for Vending the Contents of Bottled Goods."

Such machine includes a hollow cabinet within which is disposed an elongated, vertical partition 10, setting off a pair of side-by-side compartments, one of which is adapted to store articles of merchandise to be vended and particularly horizontally disposed bottles 12.

Bottles 12 rest upon a plurality of superimposed, horizontal shelves 14 along which the same are advanced step-by-step upon operation of a continuous conveyor chain 16. Chain 16 is provided with a plurality of U-shaped brackets 18 that receive the bottles 12 and guide the same along the shelves 14. Continuous chain 16 is arranged in a serpentine path and the bottles 12 are guided at alternate ends of the shelves 14 by arcuate strips 20. Each time the machine is placed in operation through insertion of a suitable coin or coins, the chain 16 is advanced one step to move all of the bottles 12 on their shelves 14 and to discharge a single bottle from the right-hand end of the lowermost shelf 14 (viewing Fig. 2).

In accordance with the present invention, the bottle 12 discharged from the lower shelf 14, is transferred to a cradle 22 by means of a tiltable hopper, broadly designated by the numeral 24 and carried by the partition 10. Cradle 22 is tiltably carried by a reciprocable frame 26 and as the bottle 12 within the cradle 22 is moved upwardly by frame 26, and as the cradle 22 tilts through various angles, cap 28 of the bottle 12 is removed, the contents of the bottle 12 poured, and the empty bottle subsequently discharged into an empty bottle compartment not herein illustrated.

Reciprocating means including a bar 30 pivotally secured to one end of frame 26, and a chain 32 passing over an idler sprocket 34 and secured to the lowermost end of frame 26 serve to impart reciprocable movement to the frame 26 and accordingly to the cradle 22 as well as the bottle contained thereby.

Hopper 24 is L-shaped, presenting a pair of legs 36 and 38 disposed substantially at right angles to each other and joined at one end by a triangular-shaped plate 40. Legs 36 and 38 may either comprise elongated flat panels or be frame-like for purposes of lightness, as illustrated in the drawing. An elongated, tubular barrel 42 extending along the legs 36 and 38 is disposed at the point of merger between such legs and is rigid thereto.

Barrel 42 is adapted to receive a hinge pin 44 that is in turn carried by a U-shaped bracket 46. Each leg respectively of the bracket 46 is in turn provided with a short barrel 48 for receiving the hinge pin 44. An elongated plate, rigidly secured within the cradle 24, is provided with an inclined portion 50 that overlies the barrel 42 and an integral portion 52 that rests directly upon the innermost face of the leg 38 remote from barrel 42.

The partition 10 is provided with an elongated notch or opening 54 within which the hopper 24 is disposed, the bight of bracket 46 being secured directly to partition 10 through the medium of fastening elements 56 with the hinge pin 44 inclined downwardly toward the rearmost wall of the vending machine cabinet not herein illustrated. Such inclination of the hinge pin 44 is substantially the same as the inclination of the cradle 22 when the latter is in the position for receiving a bottle 12 from hopper 24.

An L-shaped link 58 pivotally secured to the partition 10 as at 60, is provided with an ear 62 that extends through an arcuate slot 64 formed in the partition 10 below opening 54, the ear 62 being within the path of travel of the frame 26 as the same moves downwardly to the position shown in Fig. 2 of the drawing.

A spring 66 having one end thereof secured to the partition 10 and the opposite end secured to link 58, holds the latter biased to one end of its path of travel with the ear 62 at the uppermost end of arcuate slot 64 and with hopper 24 at that end of its path of travel opposite to that shown in full lines by Figs. 1 and 2. A short rod 68 is pivotally joined with the link 58 on one side of pivot point 60 opposite to ear 62, the opposite end of the rod 68 being pivotally joined with a finger 70 secured to and extending outwardly from the leg 36 of hopper 24.

When the machine is in a stand-by condition, the frame 26 is disposed slightly higher than that illustrated in Fig. 2 of the drawing, out of contact with the ear 62 and accordingly, the hopper 24 is in the position shown by dotted lines in Fig. 2 of the drawing as influenced by the action of spring 66. When in such stand-by condition, a bottle 12 has been delivered to the hopper 24 and rests therewithin in engagement with leg 36 and with plate 50—52, with the bottom of the bottle 12 bearing against the end plate 40.

During the initial operation of the machine, frame 26 moves downwardly into engagement with the ear 62 causing link 58 to swing on pivot 60 against the action of spring 66. Rod 68 is forced upwardly and the hopper 24 is tilted on pin 44 to the full-line position of Figs. 1 and 2. The bottle 12 contained in the hopper 24 is transferred from one side of partition 10 through opening 54, to the opposite side of the partition 10 and into the cradle 22. Frame 26, cradle 22 and the bottle 12 within cradle 22 thereupon move upwardly, clearing the finger 62 whereupon spring 66 returns the hopper 24 to the dotted-line position in Fig. 2. Hopper 24 is thereupon in a position for receiving another bottle 12 from the lowermost shelf 14 as conveyor chain 16 is subsequently advanced prior to movement of the decapped and emptied bottle from cradle 22 into the empty bottle compartment aforementioned.

It is seen that the bottle 12 is gently transferred from the lower shelf 14 by the conveyor 16 where the same slides and rolls along the leg 36 until the bottle 12 comes into engagement with the plate 50—52. Likewise, when the hopper 24 is actuated by the action of frame 26, bottle 12 is caused to roll from the plate 50—52 to the cradle 22 by the action of gravity.

Having thus described the invention what is claimed as new and desired to be secured by Letters Patent is:

In a bottle vending machine, the combination of a cabinet having a vertical partition provided with an opening and presenting a bottle storage compartment and a vending compartment; a horizontal bottle supporting shelf in the storage compartment adjacent said opening; and structure at one end of the shelf for transferring bottles singly from the shelf, through the opening and into the vending compartment, said structure comprising an elongated, transversely L-shaped hopper having a pair of legs, means at the point of merger between said legs and extending longitudinally of the hopper pivotally mounting the latter on the partition for swinging movement on an axis inclined downwardly toward one end of the hopper, one of said legs extending through the opening, means for swinging the hopper to move the other leg to a position in the storage compartment for receiving a bottle rolling from said one end of the shelf, and a wall on said one end of the hopper for receiving the bottle as the hopper is swung to a position transferring the bottle to said one leg of the hopper for gravitational movement therefrom into the vending compartment.

References Cited in the file of this patent

UNITED STATES PATENTS

| | | |
|---|---|---|
| 1,356,345 | Dun Lany | Oct. 19, 1920 |
| 1,713,333 | Economos | May 14, 1929 |
| 1,949,040 | Clausen | Feb. 27, 1934 |
| 1,993,234 | Wolfe | Mar. 5, 1935 |
| 2,587,225 | Rossi | Feb. 26, 1952 |
| 2,589,099 | Larkin | Mar. 11, 1952 |